United States Patent
Kopton

(10) Patent No.: US 10,421,139 B2
(45) Date of Patent: Sep. 24, 2019

(54) METHOD FOR PRODUCING A TAPPED BORE AND TAP DRILL BIT

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/095,469

(22) PCT Filed: May 4, 2018

(86) PCT No.: PCT/EP2018/061452
§ 371 (c)(1),
(2) Date: Oct. 22, 2018

(87) PCT Pub. No.: WO2019/029850
PCT Pub. Date: Feb. 14, 2019

(65) Prior Publication Data
US 2019/0168324 A1 Jun. 6, 2019

(30) Foreign Application Priority Data

Aug. 5, 2017 (DE) .......................... 10 2017 007 419

(51) Int. Cl.
*B23G 5/20* (2006.01)
*B23G 1/34* (2006.01)

(52) U.S. Cl.
CPC .................. *B23G 5/20* (2013.01); *B23G 1/34* (2013.01); *B23G 2200/143* (2013.01);
(Continued)

(58) Field of Classification Search
CPC ...... B23G 1/34; B23G 5/20; B23G 2200/143; Y10T 408/9048
See application file for complete search history.

(56) References Cited

U.S. PATENT DOCUMENTS 4,271,554 A * 6/1981 Grenell .................... B23G 5/20
408/220
4,651,374 A * 3/1987 Turchan ................ B23G 5/184
408/222

(Continued)

FOREIGN PATENT DOCUMENTS

DE 1818609 U 9/1960
DE 7922782 U1 11/1979
(Continued)

OTHER PUBLICATIONS

Search Report and Written Opinion (with English Translation) dated Aug. 9, 2018 in corresponding International Application No. PCT/EP2018/061452; 16 pgs.
(Continued)

*Primary Examiner* — Eric A. Gates
(74) *Attorney, Agent, or Firm* — Maier & Maier, PLLC

(57) ABSTRACT

A method for producing a tapped bore in a workpiece with a tap drill bit, which, at its drill bit tip, has a primary cutting edge and a thread profile trailing in a tap drilling direction. The method has a tap drilling stroke, in which the tap drill bit is driven into the workpiece with a tap drilling advance in the tap drilling direction and at a tap drilling rotational speed synchronized therewith, and the tool-primary cutting edge produces a core-hole bore, and the thread profile of the tool bit forms an inner thread at the inner wall of the core-hole bore. In the tap drilling stroke, shavings are produced, which are conveyed in a shavings discharge direction, which is oppositely directed to the tap drilling direction, out from the tapped bore and collide here with thread flanks of the inner thread that face the shavings that are discharged.

17 Claims, 15 Drawing Sheets

(52) U.S. Cl.
CPC ...... *B23G 2210/04* (2013.01); *B23G 2210/44* (2013.01); *Y10T 408/9048* (2015.01)

(56) References Cited

U.S. PATENT DOCUMENTS

| | | | | |
|---|---|---|---|---|
| 4,943,191 | A * | 7/1990 | Schmitt | B23G 5/184 408/1 R |
| 5,413,438 | A * | 5/1995 | Turchan | B23G 1/34 408/222 |
| 5,678,962 | A | 10/1997 | Hyatt et al. | |
| 6,012,882 | A * | 1/2000 | Turchan | B23G 5/188 408/222 |
| 6,231,281 | B1 * | 5/2001 | Nishikawa | B23G 5/184 408/222 |
| 6,663,326 | B1 * | 12/2003 | Hiroyasu | B23B 27/18 407/118 |
| 2010/0221077 | A1 * | 9/2010 | Nash | B23G 5/06 408/1 R |
| 2019/0176255 | A1 * | 6/2019 | Kopton | B23G 5/20 |

FOREIGN PATENT DOCUMENTS

| | | | |
|---|---|---|---|
| DE | 3880394 T2 | 7/1993 | |
| DE | 3939795 C2 | 9/1993 | |
| DE | 19651425 A1 * | 6/1998 | |
| DE | 69621092 T2 | 1/2003 | |
| DE | 102015200753 A1 * | 8/2015 | ............... B23G 1/34 |
| DE | 102014112162 A1 | 3/2016 | |
| EP | 0767024 A1 | 4/1997 | |
| EP | 00953396 A1 | 11/1999 | |
| GB | 2335878 A | 10/1999 | |
| JP | 2006082199 A * | 3/2006 | |
| WO | WO 2004/022274 * | 3/2004 | |

OTHER PUBLICATIONS

Examination Report dated Mar. 20, 2018 in corresponding German Application No. 102017007419.4; 4 pgs.

* cited by examiner

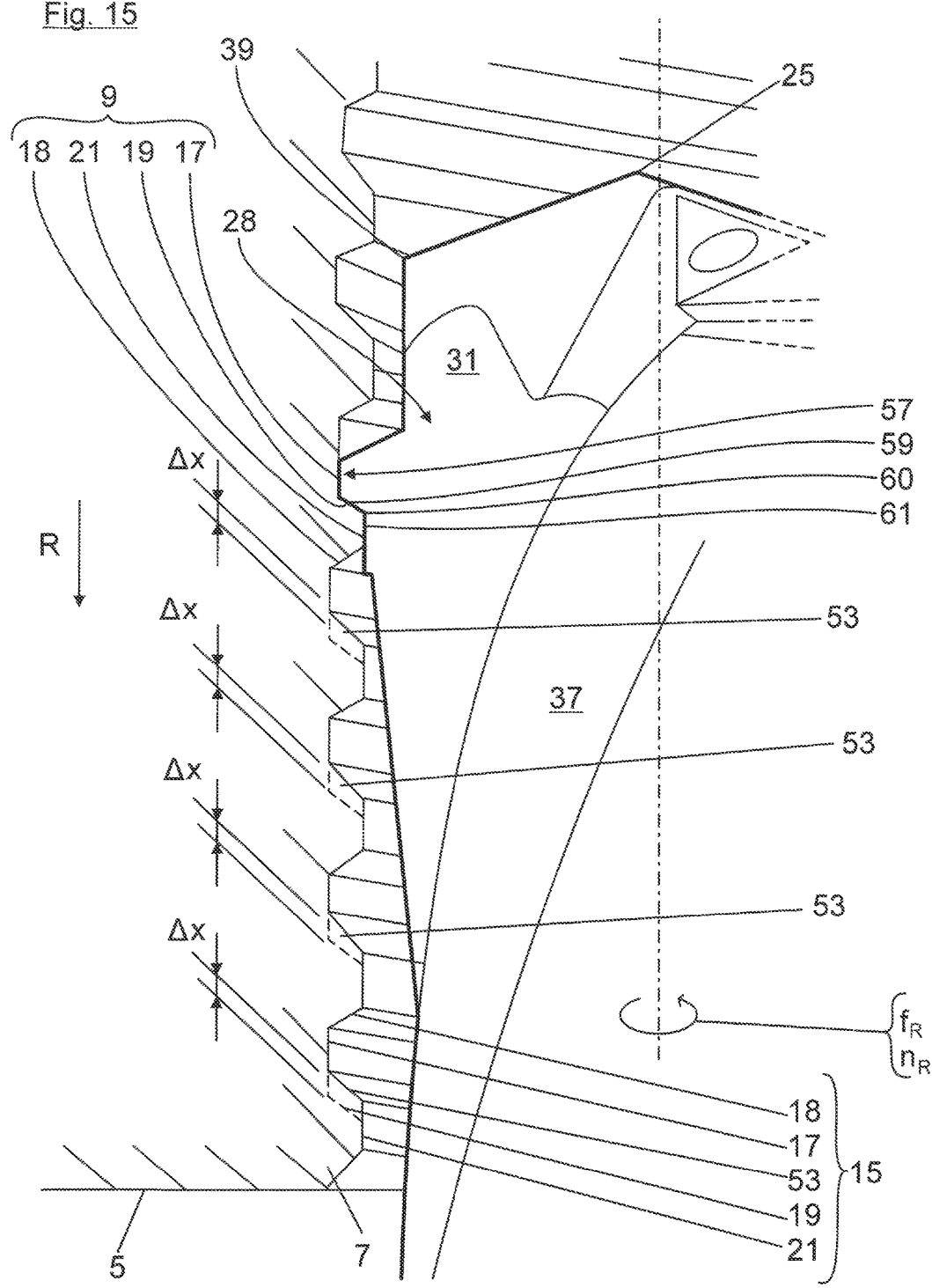

METHOD FOR PRODUCING A TAPPED BORE AND TAP DRILL BIT

FIELD

The invention relates to a method for producing a tapped bore, in particular a tapped blind bore, as well as a tap drill.

BACKGROUND

In a so-called percussion tap drilling process, a percussion tap drill bit is used both to create a core bore and to cut an inner thread in a joint tool bit stroke. The percussion tap drill bit has a primary cutting edge at its drill bit tip and a thread profile having at least one thread cutting tooth, this profile trailing in a tap drilling direction. In the method, first of all, the tap drill bit stroke occurs and, subsequently, a reverse stroke occurs in the opposite direction. In the tap drilling stroke, the primary cutting edge of the bit produces, on the one hand, the core-hole bore and, on the other hand, the thread profile of the tool bit produces the inner thread at the inner wall of the core-hole bore until a useable desired thread depth is reached. For this purpose, in the tap drilling stroke, the tap drill bit is operated during a tap drilling advance at a tap drilling rotational speed that is synchronized therewith. In the oppositely directed reverse stroke that follows, the tap drill bit is guided in a reverse direction out of the tapped bore and, in fact, this is done with an oppositely directed reverse feed as well as with a reverse rotational speed that is synchronized thereto. It is thereby ensured that the thread profile of the tap drill bit in the thread path of the inner thread is moved out of the tapped bore without any load.

In the above method, shavings are produced in the tap drilling stroke and are conveyed out from the tapped bore in a shavings discharge direction that is opposite to the tap drilling direction. In this case, the shavings moving in the shavings discharge direction collide with the thread flanks of the inner thread that face the shavings. Therefore, at the thread flanks of the inner thread that face the shavings, abrasion or removal of material can occur and lead to defects in the inner thread. Such defects can, in turn, impair the seating behavior of a screw element that is screwed into the inner thread.

Known from DE 38 80 394 T2 is a combined tool bit for drilling a hole and for cutting a thread. First of all, a core-hole bore is produced using the tap drill bit. Subsequently, the tap drill bit is moved with its tool bit axis in a circular path around the drilling axis and, in fact, this is conducted with rotation of the tap drill bit, as a result of which the thread profile produces an inner thread in the core-hole bore. Essentially the same method is also known from DE 39 39 795 C2 and from U.S. Pat. No. 5,678,962.

SUMMARY

The object of the invention consists in providing a method for producing a tapped bore in a workpiece as well as a tap drill bit with which a permanently operationally secure screw connection is ensured.

The invention is based on the fact that, in the tap drilling stroke, the shavings that are to be discharged collide with the thread flanks of the inner thread that face the shavings and can potentially damage them. Against this background, in accordance with the characterizing part of patent claim 1, the thread flanks of the inner thread that face the shavings are not yet produced with a finished dimension in the tap drilling stroke, but rather are produced with a flank material allowance. In this way, at the thread flanks that face the shavings, a collision contour is provided with which the shavings to be discharged collide.

Only in a final processing step, which occurs after the tap drilling stroke, can the flank material allowance of the thread flanks of the inner thread that face the shavings be removed to produce the final dimension. Preferably, this final processing step takes place in the reverse stroke, during which the thread profile of the tool bit that is guided out of the tapped bore in the reverse direction removes material from the flank material allowance of the flanks facing the shavings until the final dimension is obtained.

In the tap drilling stroke, the tap drilling advance and the tap drilling rotational speed synchronized therewith are matched to each other in such a way that the produced thread turn of the inner thread has a predefined tapped-bore thread pitch. Analogously to this, in the reverse stroke, the reverse feed and the reverse rotational speed synchronized therewith are also matched to each other in such a way that a reverse thread pitch is obtained. Depending on the adjustment of the aforementioned parameters, the reverse thread pitch can be identical to the tapped-bore thread pitch or else, if need be, it can be different from it. By way of example, it is possible in the tap drilling stroke to impose a first pitch (that is, a tapped-bore thread pitch) on the inner thread, while, in the reverse stroke, a second thread pitch (that is, a reverse thread pitch), which is different from the first thread pitch, is imposed on the inner thread. The reverse thread pitch and the thread-stroke thread pitch can be adjusted with respect to each other in such a way that, overall, a load-optimized design of the inner thread profile is obtained.

By way of example, in the tap drilling stroke—with the exception of the thread flanks of the inner thread that face the shavings—the inner thread geometry (that is, the thread flanks of the inner thread that face away from the shavings, the radial inner-thread inner crown of the inner thread, and the radially outer thread base of the inner thread) can already be produced in a final dimension. Only afterwards is it possible, in the reverse stroke, to produce the thread flanks of the inner thread that face the shavings to the final dimension.

In a preferred embodiment, the reverse stroke does not immediately follow the tap drilling stroke, but instead there follows a flute-forming step, in which a peripheral flute, which adjoins the inner thread and has no thread pitch and in which the thread profile of the tap drill bit can rotate without any load, is formed. In this way, the tap drilling speed can be reduced to zero, without any breakage of the tool bit or any breaking of the thread profile occurring based on an excessively large cutting load.

The thread profile of the tap drill bit can have thread profile teeth, which are described below, and/or at least one reverse tooth. Both the thread profile teeth and the reverse tooth can be formed respectively as a shaping tooth (with corresponding shaping edges) or as a cutting tooth (with corresponding cutting edges that remove shavings) or as a combination thereof.

As mentioned above, the thread profile of the tap drill bit can rotate free of load in the peripheral flute produced without a thread pitch in the flute-forming step. The provision of the peripheral flute, moreover, makes it possible for the tap drill bit to use a cutting edge to produce a peripheral thread countersink in the opening of the bore. The peripheral thread countersink can therefore be produced during the above flute-forming step.

In a technical implementation, the tap drilling stroke can be extended in the tap drilling direction directly by a flute-forming stroke. In this case, the tap drill bit can be moved beyond the desired thread depth until a desired bore depth is reached and, in fact, done so with a flute-forming advance as well as at a flute-forming rotational speed that are not synchronized to each other and/or are different from the tap drilling advance and from the tap drilling rotational speed.

It is preferred when, at the end of the flute-forming step, the thread profile, as viewed in the axial direction, can rotate completely in the peripheral flute of the tapped bore without any load. The peripheral flute is produced during the flute-forming stroke by use of the primary cutting edge as well as the bit thread profile at the tap drill bit.

When the desired bore depth has been reached, the flute-forming advance is reduced to zero. At the same time, the flute-forming rotational speed is also reduced to zero in order to make possible the reversal in the direction of rotation that is required for the reverse stroke.

At the start of the reverse stroke, the tap drill bit is controlled in such a way that the thread profile of the tool bit cannot be driven in without a load, but rather can be retracted under shaving-removal load into the thread turn run-out that opens into the peripheral flute. Subsequently, the tap drill bit is guided out of the tapped bore in a direction that is opposite to the tap drilling direction and, in fact, is conducted with a reverse feed as well as at a reverse rotational speed synchronized therewith, as a result of which the thread profile of the tool bit can be rotated out of the tapped bore with removal of material (that is, with finishing of the thread flanks facing the shavings to the final dimension).

When the tap drilling stroke, the flute-forming stroke, and the reverse stroke are being carried out, the longitudinal axis of the core bore axis and the axis of rotation of the tap drill bit preferably remain at all times in coaxial alignment with one another.

A tap drill bit for carrying out such a method can preferably have a clamping shank and a tap drill bit body joined to it. At least one shavings groove can extend along the longitudinal axis thereof up to a front-end primary cutting edge at the drill bit tip. At the front-end primary cutting edge, a shavings surface that delimits the shavings groove and a front-end free surface of the drill bit tip converge. As viewed in the peripheral direction of the tool bit, the shavings groove can be delimited by at least one drill bit web. The shavings surface of the shavings groove can transition into a back surface of the drill bit web on the outer peripheral side with formation of a secondary cutting edge. At the back surface of the drill bit web on the outer peripheral side, the thread profile can be formed with at least one thread cutting tooth. The tooth height of the cutting tooth is dimensioned in the radial direction in such a way that the cutting tooth protrudes outward over the primary cutting edge in the radial direction by a radial offset. If need be, the cutting tooth can extend the primary cutting edge outward in the radial direction so that the surfaces are flush with each other. Alternatively and/or additionally, the cutting tooth, as viewed in the axial direction, can be arranged at an axial offset behind the primary cutting edge.

In a preferred embodiment variant, the tap drill bit can have three drill bit webs. Each of these drill bit webs is formed with at least one thread cutting tooth. The thread cutting teeth are preferably not formed with the same cutting geometry, but rather are different in design. By way of example, it is possible to form in the peripheral direction of the drill bit, in succession, a preliminary cutting tooth, a middle cutting tooth, and a finished processing tooth of different cutting geometry at the drill bit. The cutting teeth are formed offset with respect to one another at the tap drill bit in the axial direction. The extents of their offsets are adjusted in such way that, by the tap drilling rotational speed and by the tap drilling advance, a flawless thread cutting is ensured.

In order that, in the reverse stroke, the flank material allowance is removed from the thread flanks facing the shavings in an operationally safe manner (that is, without premature breakage of the tool bit), the thread profile of the tool can preferably have at least one reverse tooth that is formed specially for this purpose. Said tooth can be formed with a thread-flank cutting/shaping edge. In the reverse stroke, the thread-flank cutting/shaping edge can remove the flank material allowance of the thread flanks that face the shavings, said flank material allowance being preserved in the tap drilling stroke, until the final dimension is reached.

The reverse tooth, like the thread profile tooth, is also formed on the back surface of the drill bit web. In a technical embodiment of the tool bit, the reverse tooth can protrude radially outward over the primary cutting corner by a reverse tooth height. The thread-flank cutting edge of the reverse tooth can transition into a reverse cutting edge at a radially inner, cutting inner corner. In this case, the tap drill bit processes not only the thread flanks of the bore-hole inner thread facing the shavings, but, at the same time, also deburrs the thread inner crown thereof. Preferably, the reverse tooth and/or the reverse cutting edge can be constructed in terms of design in such a way that they are active only in the reverse stroke and largely functionless in the tap drilling stroke.

The above-mentioned reverse cutting edge can extend along the longitudinal direction of the drill bit. In this case, it is possible for the back surface of the drill bit web on the outer peripheral side and the shavings surface of the shavings groove to converge. For this reason, the reverse cutting edge and the secondary cutting edge are formed at the longitudinal edges of the drill bit web that lie opposite one another in the peripheral direction of the drill bit.

In order to create a stable thread profile at the tap drill bit, it is preferred when, in the peripheral direction of the drill bit, a tooth web that is formed on the back surface of the drill bit web adjoins the at least one thread profile tooth and/or the reverse tooth. In this way, the thread profile tooth and/or the reverse tooth is or are protected in the tap drilling stroke and/or in the reverse stroke against premature breakage of the tool bit. Preferably, the thread profile tooth and the reverse tooth can be joined to each other via a tooth web formed on the back surface of the drill bit web. The tooth web can have front sides that face away from each other in the peripheral direction of the drill bit, each of which forms the thread profile tooth and the reverse tooth.

The tooth web can have a radially outer web crown surface as well as a web flank surface facing the drill bit tip and a web flank surface facing away from the drill bit tip. In order to reduce the tool load during the tap drilling stroke and/or during the reverse stroke, the above-mentioned web surfaces can be formed at least in part as free surfaces, which, in the tap drilling stroke and/or in the reverse stroke, are essentially functionless.

The web crown surface of the above tooth web can transition at a first peripheral web edge into the web flank surface that faces the drill bit tip. In addition, the web crown surface can transition at a second peripheral web edge into the web flank surface that faces away from the drill bit tip.

In regard to a reduced tool load during the flute-forming stroke, it is preferred when the tap drill bit has a special peripheral flute-cutting edge in order to produce the peripheral flute in the flute-forming stroke. In a preferred embodiment variant, at least one of the two above-mentioned peripheral web edges can be formed as such a peripheral flute-cutting edge, by means of which, in the flute-forming stroke, the peripheral flute adjoining the bore-hole inner thread is formed. In the tap drilling stroke and in the reverse stroke, in contrast, the peripheral cutting edge can be essentially functionless.

As ensues from the above description, the peripheral flute can adjoin the inner thread of the tapped bore. Said peripheral flute fulfills the following dual function: First, when the thread is produced, it is possible to rotate the thread profile of the tap drill bit without any load. Second, when a fastening screw is screwed in, the peripheral flute forms a compensatory space, which compensates for screw length tolerances of the fastening screw. The screw length of such a fastening screw is strongly subject to tolerances owing to manufacture. By use of the peripheral flute, it is possible to screw in the fastening screw, which is subject to tolerances, in a process-secure manner, without needing to increase the thread depth of the tapped bore, as would be required in the prior art.

BRIEF DESCRIPTION OF THE DRAWINGS

The invention and its advantageous embodiments and enhancements as well as the advantages thereof will be explained in detail below on the basis of drawings.

Shown are:

FIG. 15 a view corresponding to FIG. 10.

DETAILED DESCRIPTION

Figure 1:
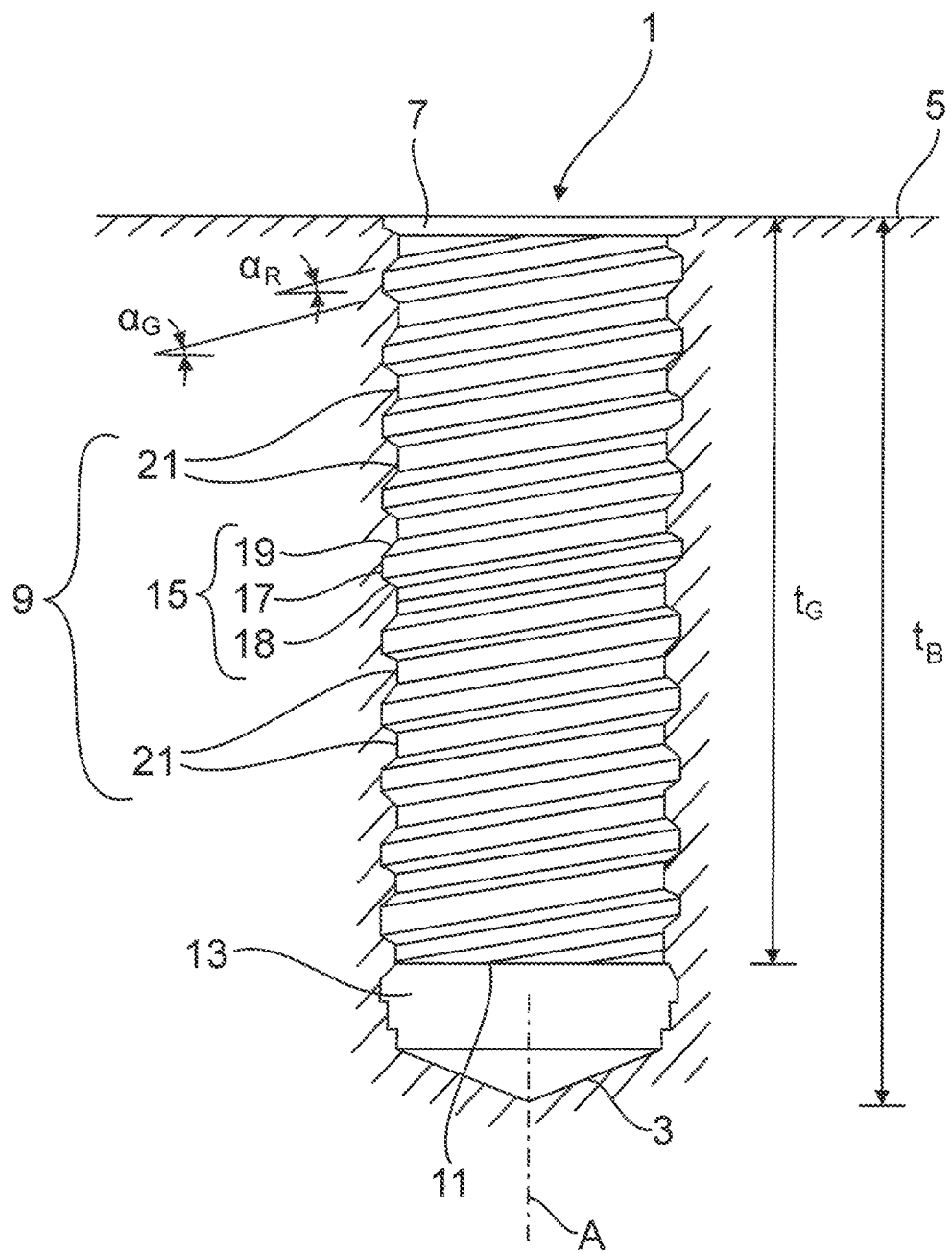
FIG. 1 in a lateral sectional illustration, a tapped blind bore formed in a workpiece.

Shown in FIG. 1 is a finished tapped blind-hole bore 1. The bore 1 is created with its bore base 3 to a desired bore depth $t_B$ in a workpiece 5 by means of a so-called percussion bore processing, which will be explained later on the basis of FIGS. 5 to 8. At its bore opening, the bore 1 has a peripheral thread countersink 7, which, in its further course downward, transitions into an inner thread 9. The inner thread 9 extends along the bore axis A to a useable desired thread depth $t_G$. As further ensues from FIG. 1, a thread turn 15 of the inner thread 9 opens with a thread run-out 11 into a peripheral flute 13. Said peripheral flute does not have a thread pitch and, as viewed in the axial direction, is formed between the inner thread 9 and the bore base 3. The thread turn 15 has a radially outer thread base 17 as well as laterally top and bottom thread flanks 18, 19, which transition radially inward into a thread inner crown 21. The top thread flanks 19 in FIG. 1 are the thread flanks that face the shavings and are described later on the basis of FIGS. 9 and 10, whereas the bottom thread flanks 18 in FIG. 1 are the thread flanks that face away from the shavings.

Figure 2:
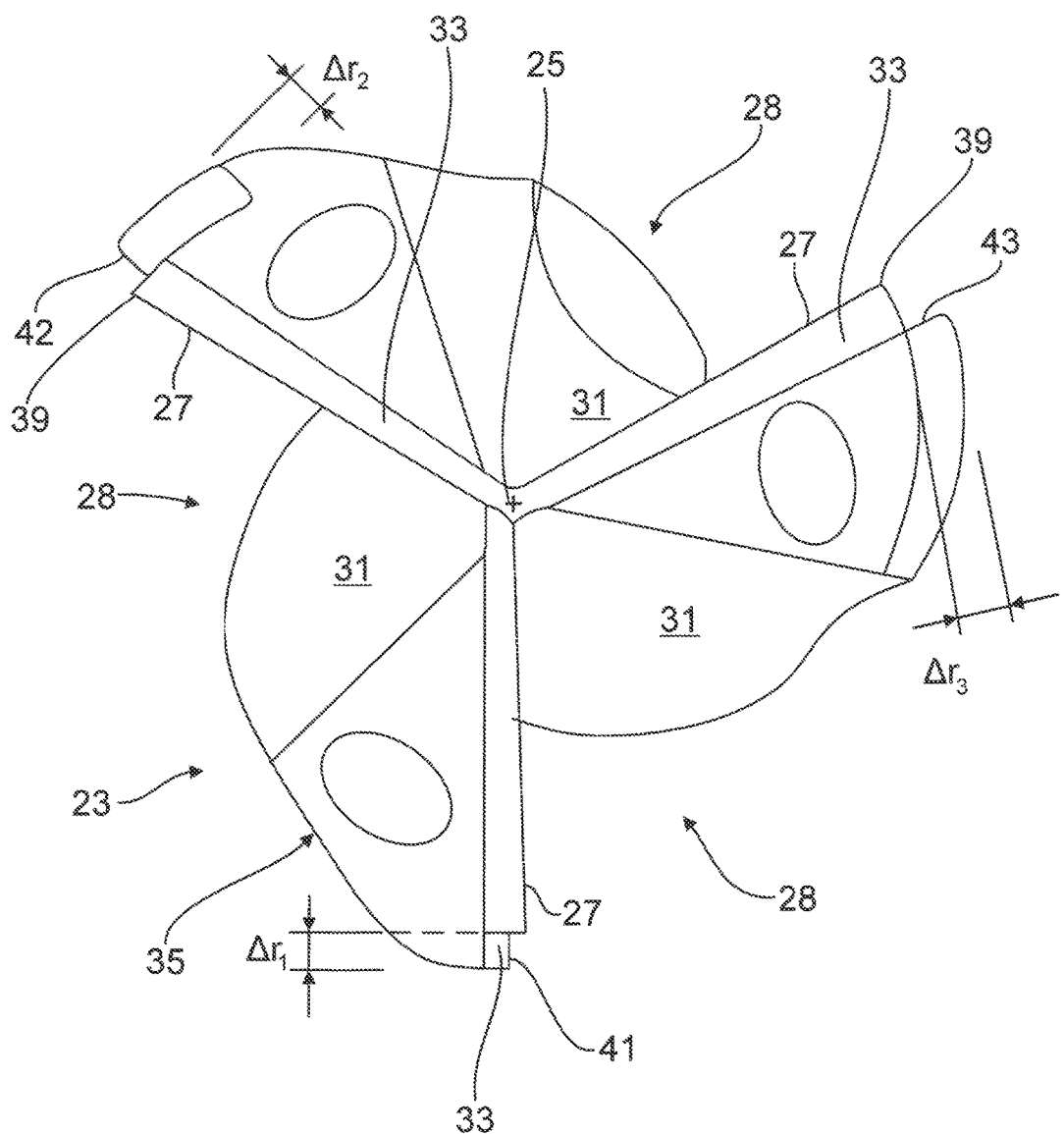
FIG. 2 in a view from the front, a tap drill bit.
Figure 3:
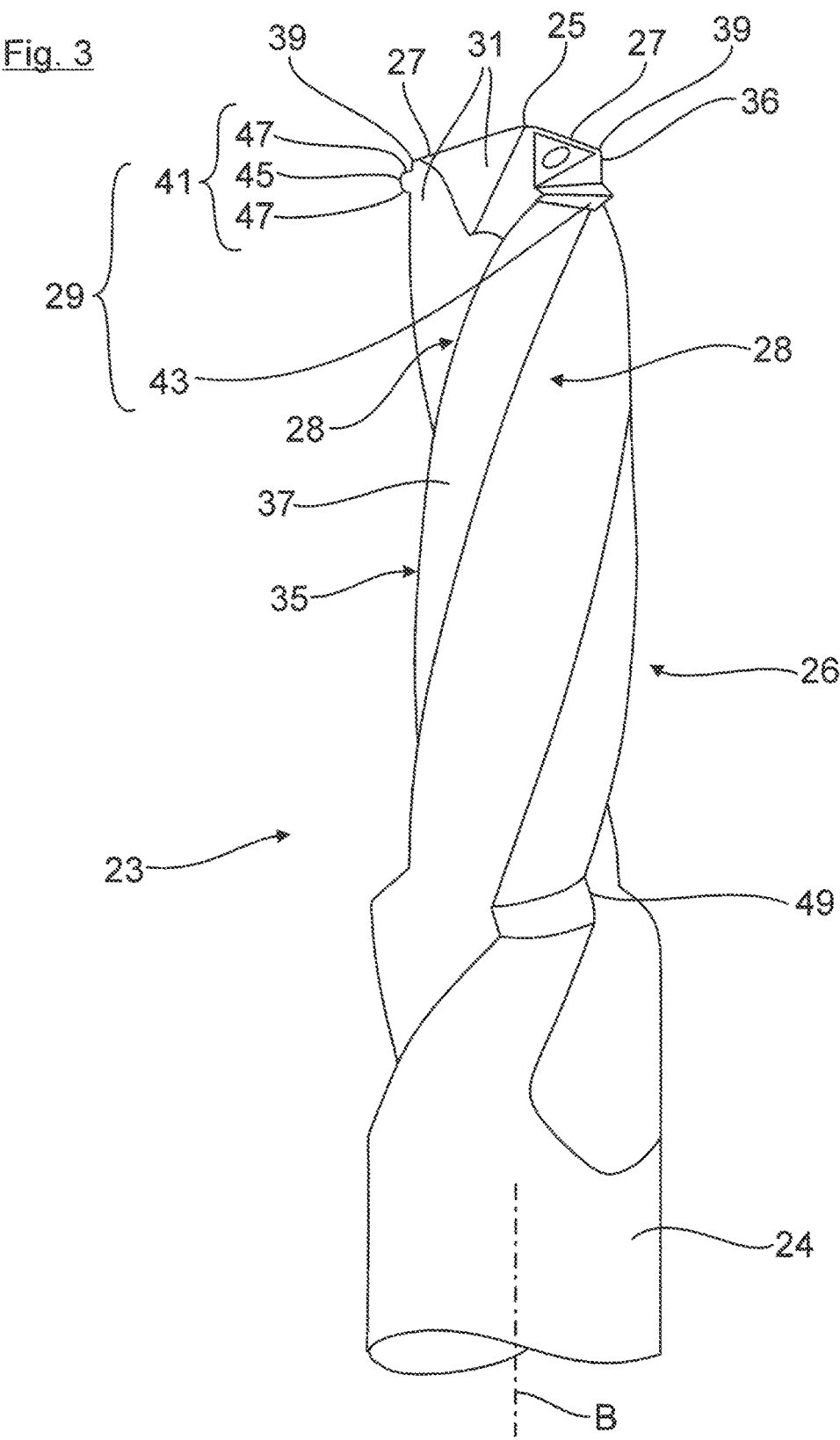
FIG. 3 a side view of the tap drill bit.
Figure 4:
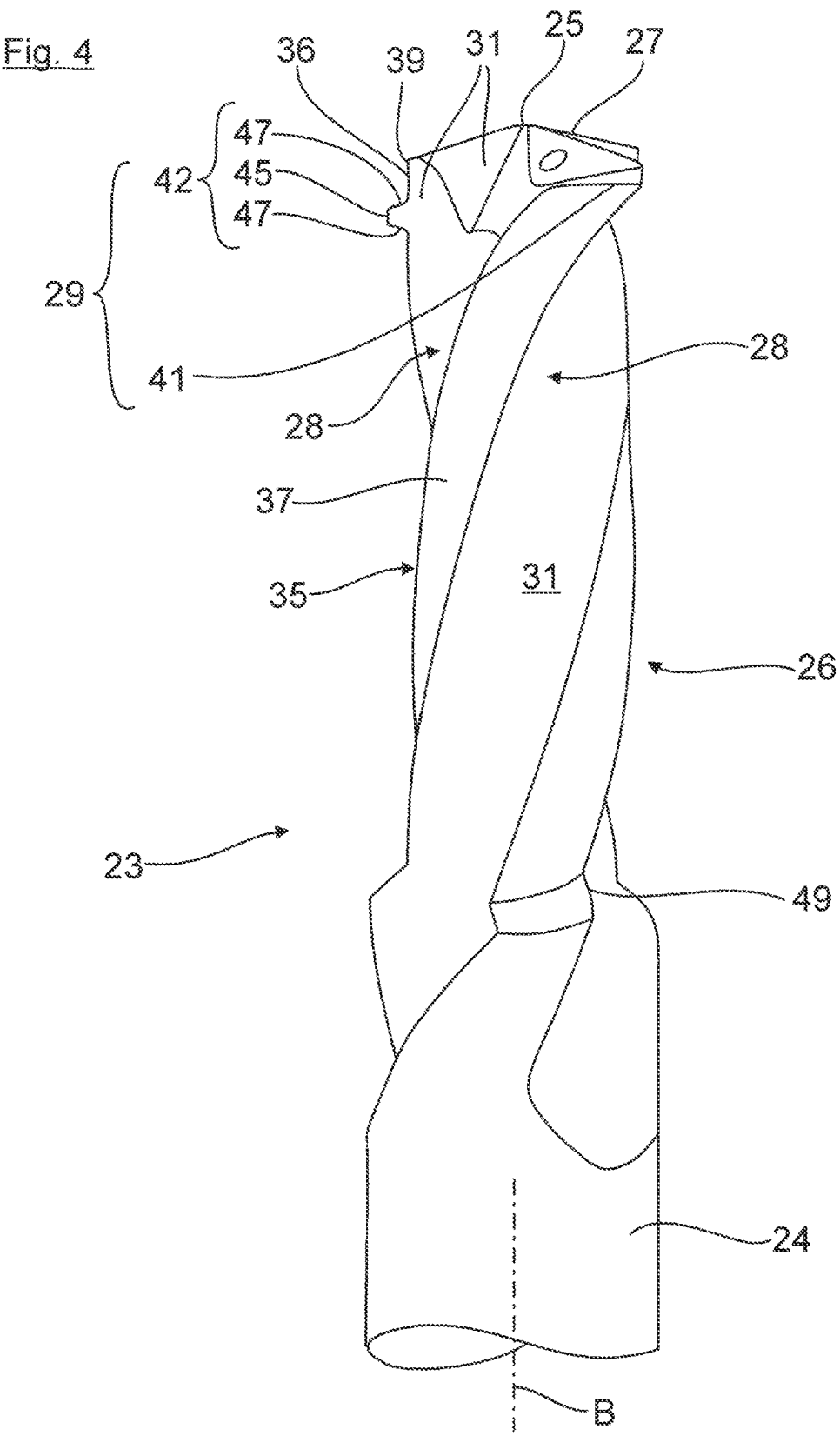
FIG. 4 another side view of the tap drill bit.
Figure 5:
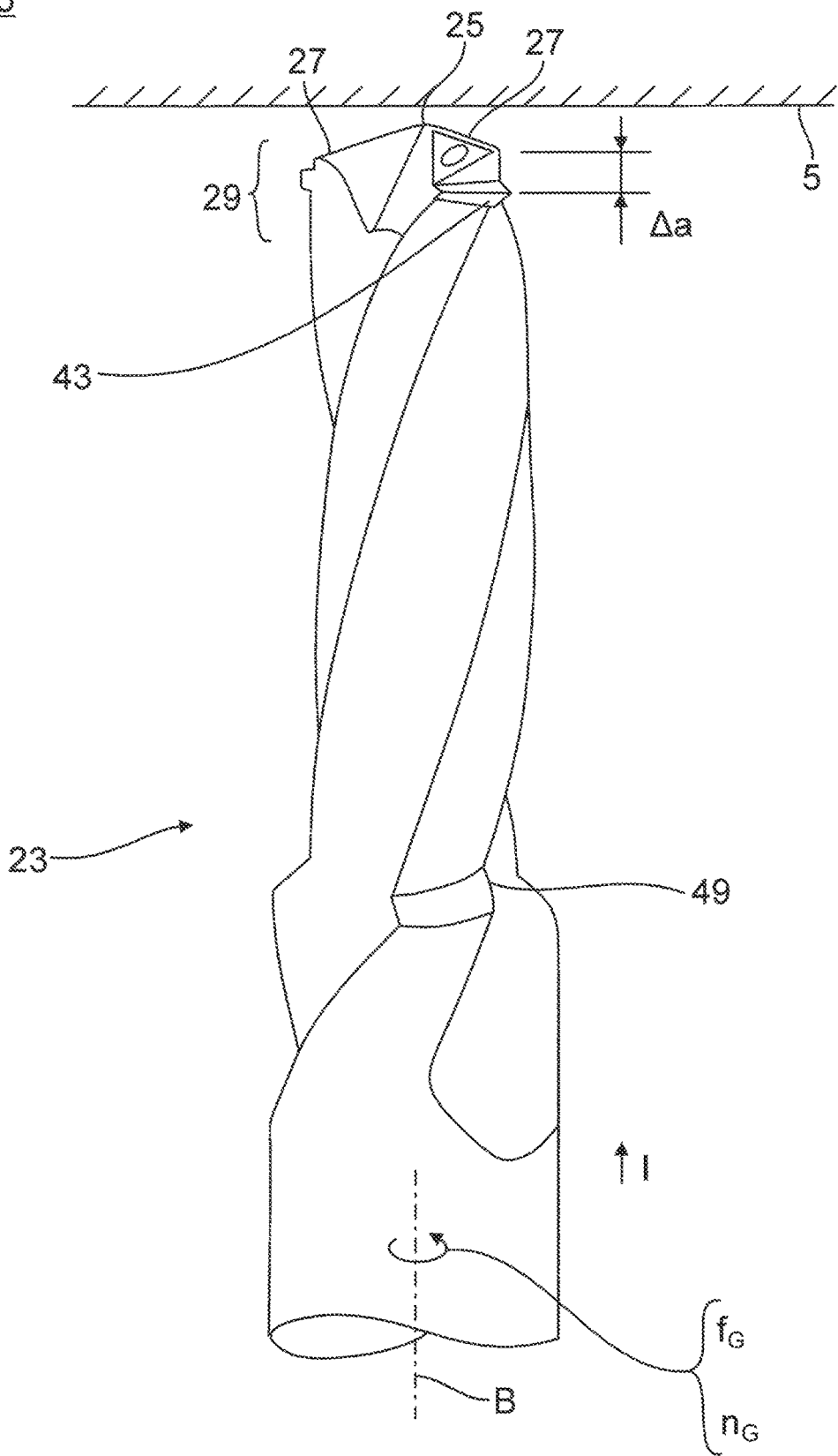
FIG. 5 a view, which illustrates the method steps for producing the tapped blind bore shown in FIG. 1.
Figure 6:
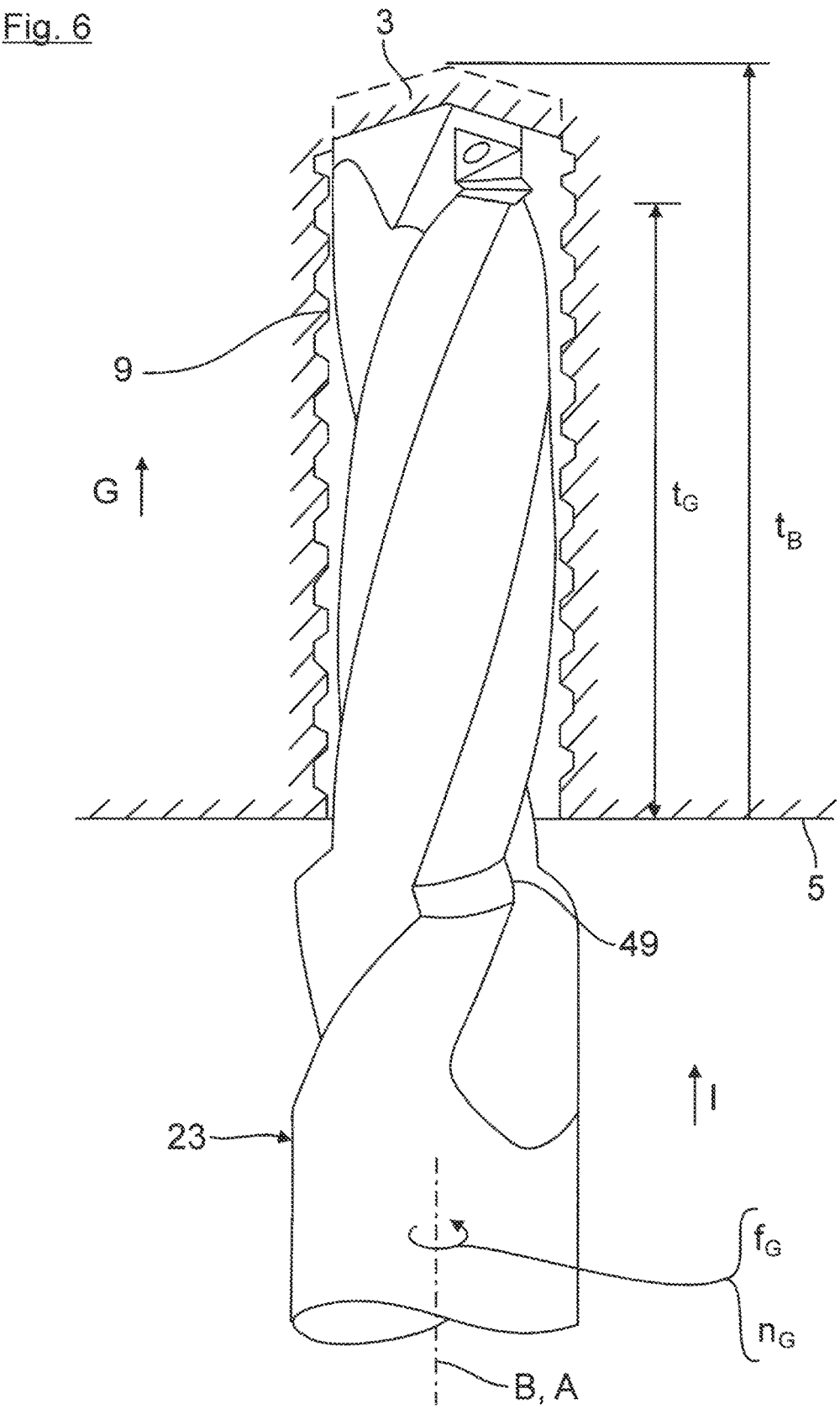
FIG. 6 a different view, which illustrates the method steps for producing the tapped blind bore shown in FIG. 1.

The tapped blind-hole bore 1 shown in FIG. 1 is produced by use of a tap drill bit 23, which is described below on the basis of FIGS. 2 to 4. In accordance therewith, at its drill bit tip 25, the tool bit 23 in FIG. 2 has three front-end primary cutting edges 27, which are distributed uniformly around the periphery, as well as a thread profile 29 trailing in the tap drilling direction I (FIG. 5 or 6).

The tool bit 23 is constructed with a clamping shank 24 as well as with a tap drill bit body 26 adjoined to it, along the bore axis A of which a total of three shavings grooves 28, which are distributed uniformly over the periphery, extend up to the respective front-end primary cutting edge 27 at the drill bit tip 25.

At each primary cutting edge 27, a shavings surface 31, which delimits the shavings groove 28, and a front-end free surface 33 of the drill bit tip 25 converge. In the peripheral direction of the tool bit, the respective shavings groove 28 is delimited by a drill bit web 35. Overall, the tap drill bit 23 shown in the figures has three drill bit webs 35. The shavings surface 31 of the shavings groove 28 transitions here into a back surface 37 of the respective drill bit web 35 on the outer peripheral side, with formation of a secondary cutting edge 36. The secondary cutting edge 36 and the front-end primary cutting edge 27 converge at a radially outer primary cutting corner 39.

At the back surfaces 37 of the three drill bit webs 35 on the outer peripheral side, each thread profile 29 has a preliminary cutting tooth 41, a middle cutting tooth 42, and a finished cutting tooth 43. Each of the cutting teeth 41, 42, 43 is formed with a radially outer thread-base cutting edge 45 as well as with thread-flank cutting edges 47 in order to cut/shape the thread turn 15 shown in FIG. 1. In this case, the cutting teeth 41 to 43 are designed with different geometries and spaced at different axial distances Δa (indicated only in FIG. 5) from the drill bit tip 25 in order to cut the thread turn 15 of the inner thread 9 shown in FIG. 1. In addition, the preliminary cutting tooth 41, the middle cutting tooth 42, and the finished cutting tooth 43 have different tooth heights $\Delta r_1$, $\Delta r_2$, $\Delta r_3$ in the radial direction (FIG. 2). By way of example, the preliminary cutting tooth 41, the middle cutting tooth 42, and the finished cutting tooth 43 can be axially larger in the peripheral direction. The finished cutting tooth 43 then cuts the entire inner thread contour. Alternatively to this, the finished cutting tooth 43 can also be designed as a shaping tooth in order to increase the thread strength.

In addition, at the transition between the tap drill bit body 26 and the clamping shank 24, the tap drill bit 23 has a cutting edge 49 for formation of the thread countersink 7 shown in FIG. 1.

Described below on the basis of FIGS. 5 to 8 is the method for producing the tapped blind-hole bore 1 shown in FIG. 1: In accordance therewith, in FIG. 5, the tap drill bit 23 is guided in a tap drilling direction I toward the workpiece 5, which has not yet been pre-drilled, and a percussion boring is carried out. In a tap drilling stroke G, the main cutting edges 27 produce a core-hole bore and, at the same time, the trailing thread profile 29 produces the inner thread 9 at the inner wall of the core-hole bore. The tap drilling stroke G occurs with a tap drilling advance $f_G$ and at a tap drilling rotational speed $n_G$ synchronized therewith in a tap drilling direction of rotation and, in fact, is carried out until the desired thread depth $t_G$ is reached (FIG. 6).

Immediately afterwards, a flute-forming step (FIG. 7) is carried out, in which the tap drilling stroke G is extended in the tap drilling direction I by a flute-forming stroke N. In the flute-forming stroke N, in contrast to the thread-forming stroke G, the flute-forming advance $f_N$ and the flute-forming rotational speed $n_N$ of the tap drill bit 23 are not synchronized with each other and are different from the tap drilling advance $f_G$ and from the tap drilling rotational speed $n_G$.

Figure 7:
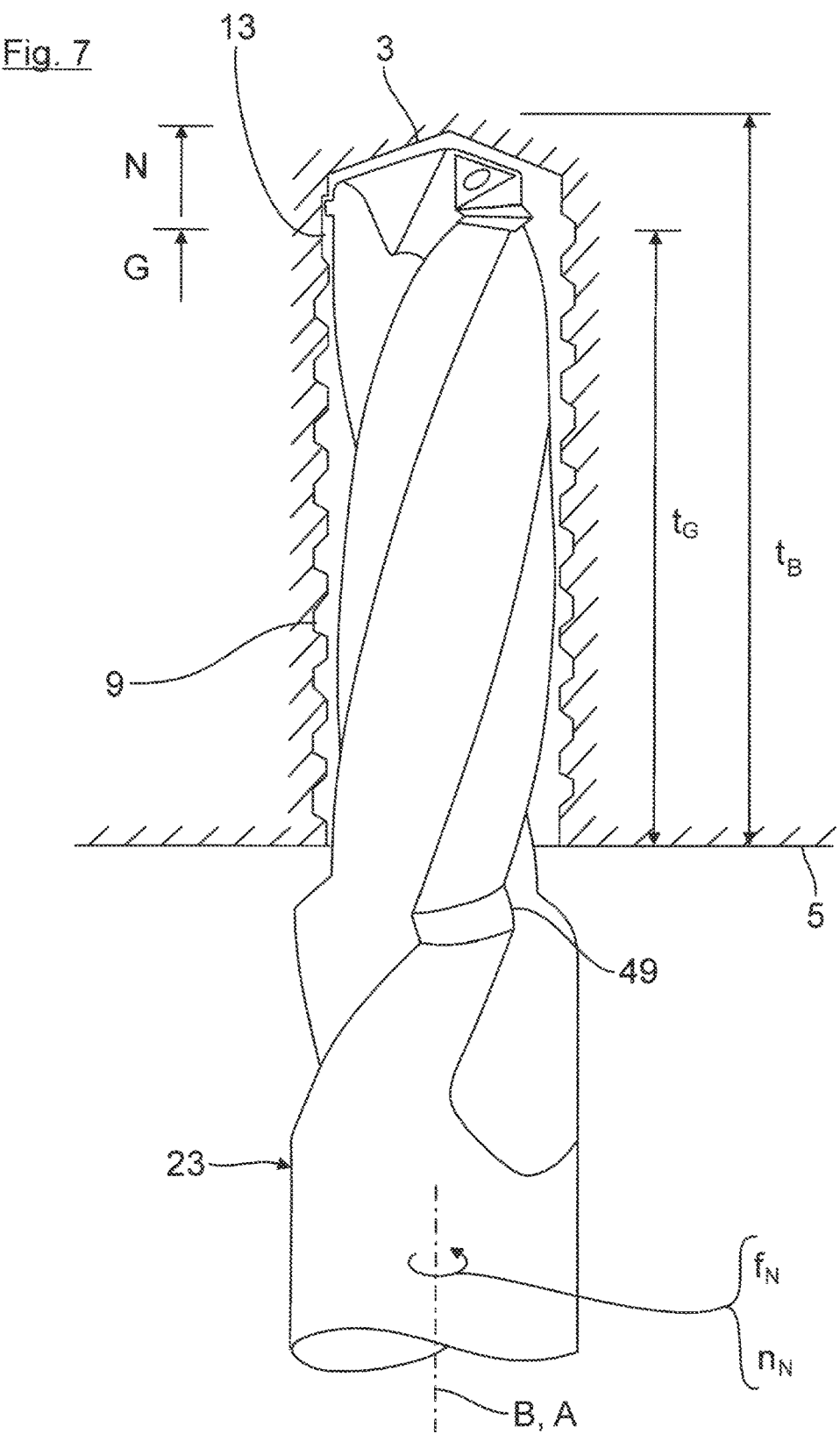
FIG. 7 a different view, which illustrates the method steps for producing the tapped blind bore shown in FIG. 1.
Figure 8:
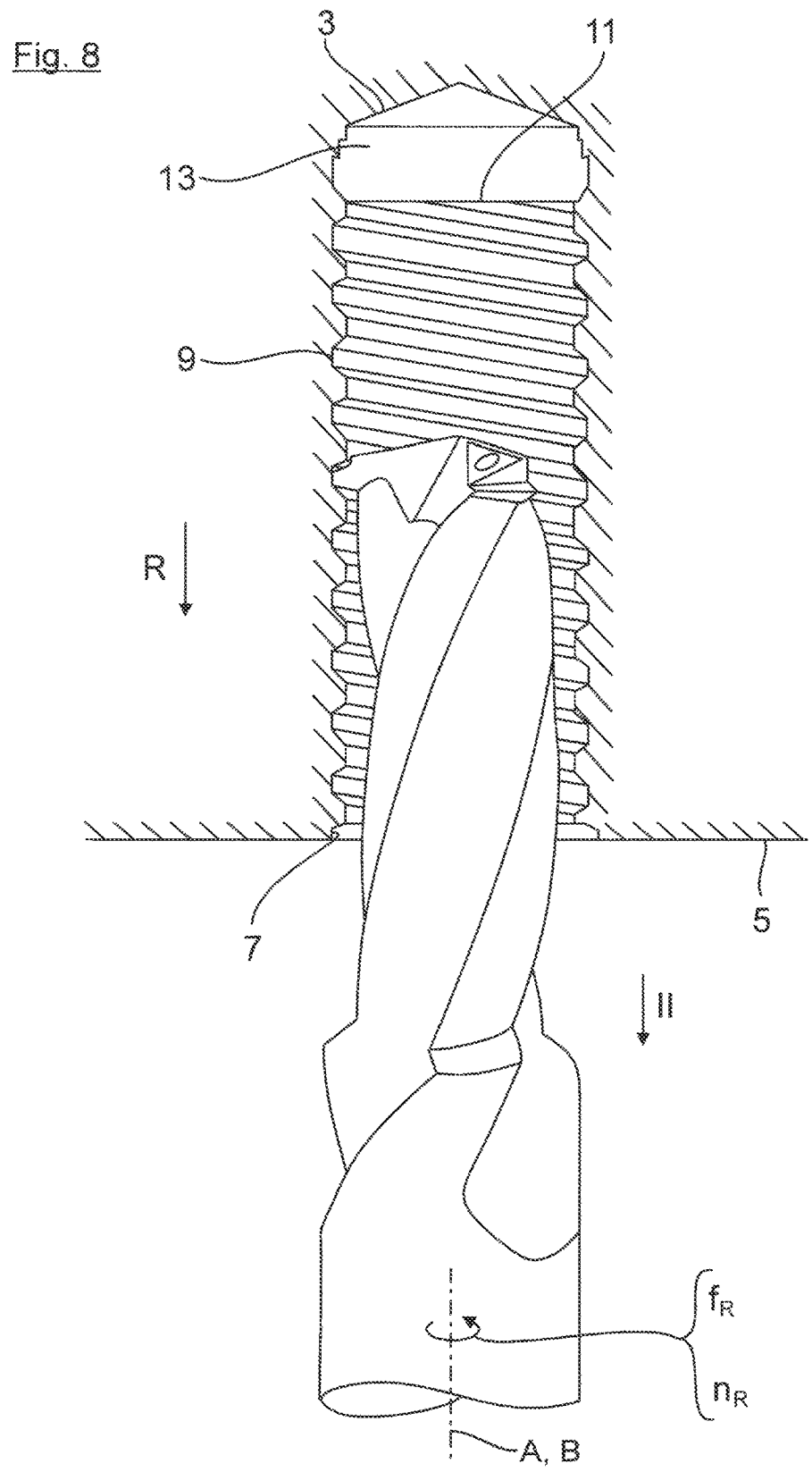
FIG. 8 a different view, which illustrates the method steps for producing the tapped blind bore shown in FIG. 1.

In this way, the thread profile 29 uses its preliminary cutting tooth 41, its middle cutting tooth 42, and its finished cutting tooth 43 to produce the peripheral flute 13 shown in FIG. 7, in which the thread profile 29 can rotate without any load. The flute-forming advance $f_N$ and the flute-forming rotational speed $n_N$ are established in such a way that an excessively large cutting edge load on the cutting teeth 41 to 43 is prevented.

When the desired bore depth $t_B$ is reached, both the flute-forming advance $f_N$ and the flute-forming rotational speed $n_N$ are reduced to zero. Subsequently, for preparation of a reverse stroke R (FIG. 8), a reversal in the direction of rotation occurs. In the reverse stroke R (FIG. 8), the tap drill bit 23 is guided in a reverse direction II (FIG. 8) out from the tapped bore 1 and, in fact, is guided with an oppositely directed reverse feed $f_R$ as well as with a reverse rotational speed $n_R$ synchronized therewith. These parameters are of such a magnitude that the thread profile 29 of the tap drill bit 23 is not free of load, but rather is guided out of the tapped bore 1 with a shaving-removal load in the thread turn 15 of the inner thread 9. In this way, as will be described later, material is removed from a collision contour 53 (FIG. 9 or 10), which is still formed at the thread flanks 19 of the inner thread 9.

At the start of the reverse stroke R, the tap drill bit 23 of the fabrication unit is actuated in such a way that the cutting teeth 41, 42, 43 are each driven with shaving-removal load into the thread turn run-out 11, which opens into the peripheral flute 13. In the further course of the reverse stroke R, the thread profile 29 of the tap drill bit 23 is then rotated outward, with shaving-removal load (that is, material is removed from the collision contour 53) through the thread turn 15 of the inner thread 9.

Figure 9:
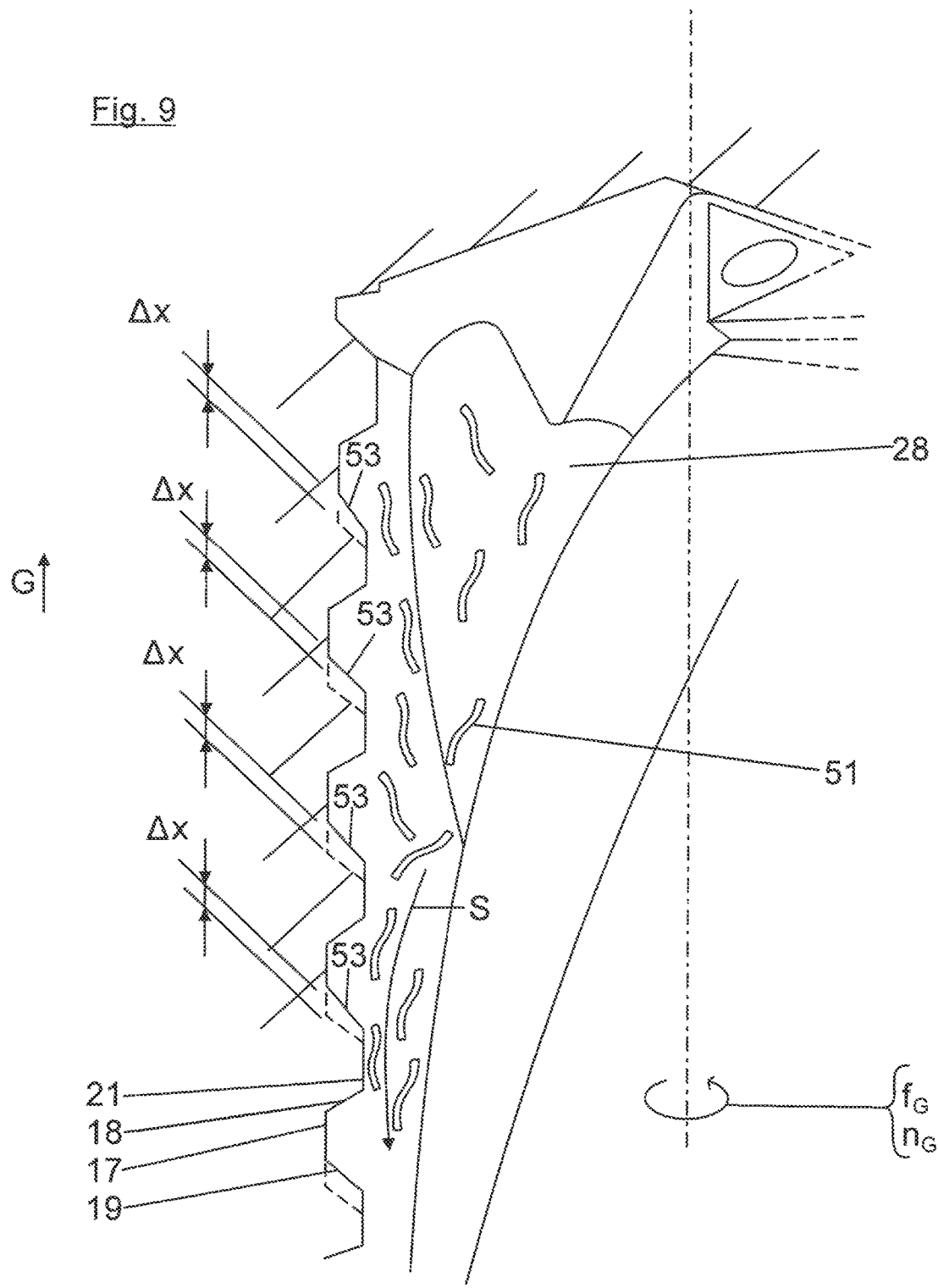
FIG. 9 an enlarged partial view, in which a discharge of shavings during the tap drilling stroke is illustrated.
Figure 10:
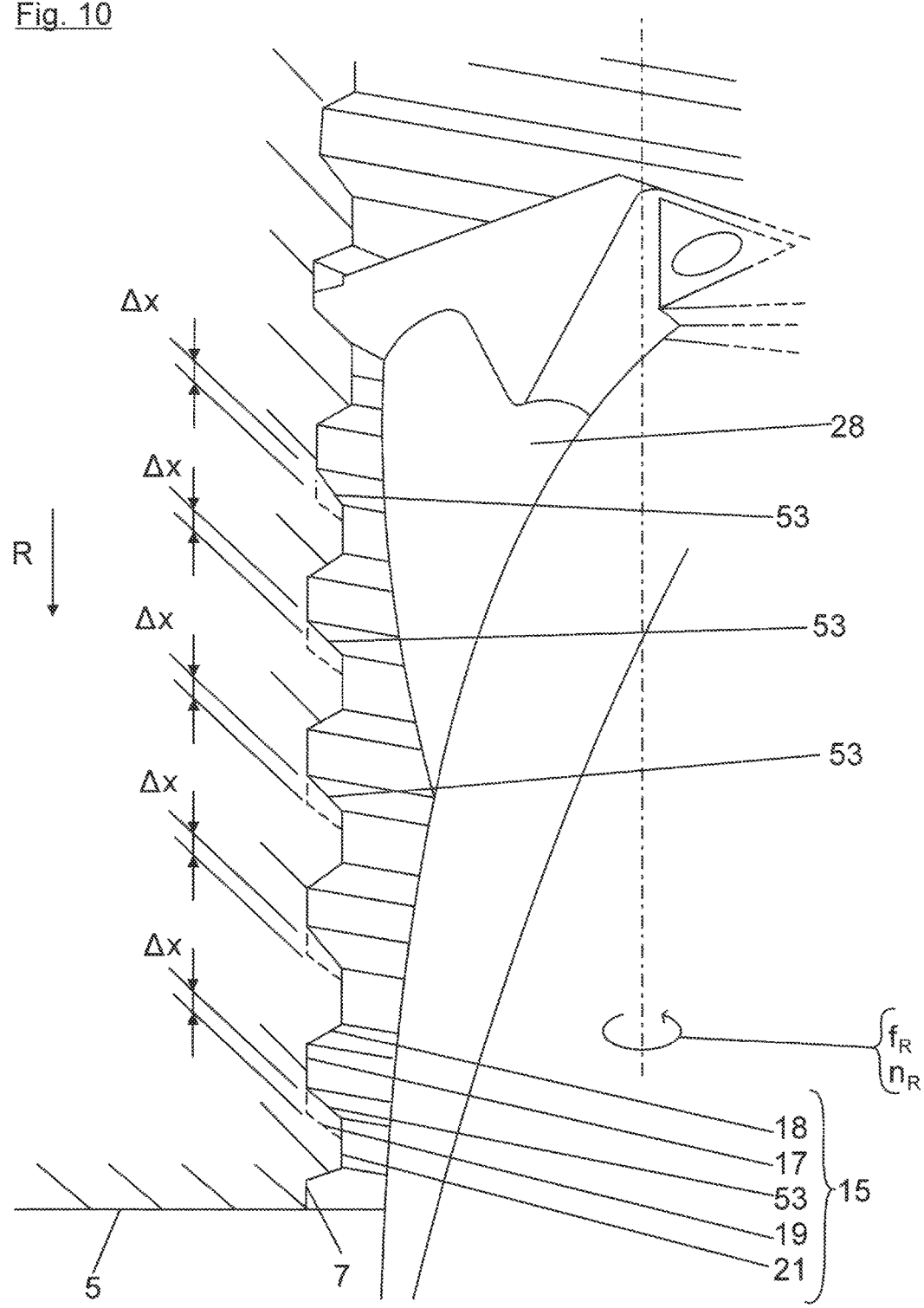
FIG. 10 an enlarged partial view, in which a removal of material during the reverse stroke is illustrated.

In FIG. 9, the tap drilling stroke G illustrated in FIG. 6 is shown in detail. In accordance therewith, the tap drill bit 23 is driven with the predefined tap drilling advance $f_G$ as well as at the tap rotational drilling speed $n_G$ synchronized therewith in the tap drilling direction I into the workpiece 5. Shavings 51 are thereby produced, which are forced in a shavings discharge direction S, which is opposite to the tap drilling direction I, out from the tapped bore 1. The shavings 51 that are conveyed in the shavings discharge direction S out from the tapped bore 1 in this case collide with the thread flanks 19 facing the shavings of the inner thread 5.

In accordance with the invention, in the tap drilling stroke I—with the exception of the thread flanks 19 that face the shavings of the inner thread 9—the complete inner thread geometry is already produced with the final dimension, namely, specifically, the thread flanks 18 that face away from the shavings, the radial inner-thread inner crown 21, and the radially outer thread base 17. In contrast to this, the thread flanks 19 that face the shavings of the inner thread 9 after the tap drilling stroke I are not yet produced in a final dimension, but rather are produced with an additional flank material allowance $\Delta x$ (FIG. 9). In this way, at the thread flanks 19 that face the shavings, a collision contour 53 is provided, with which the shavings 51 to be discharged collide.

In the subsequent reverse stroke R, material is removed from the above collision contour 53 at the thread flanks 19 facing the shavings until the final dimension is reached. For this purpose, in the flute-forming step, the tap drill bit is positioned in the axial direction in such a way that, at the start of the reverse stroke R, the tap drill bit 23 is controlled in such a way that the thread profile 29 is driven under shaving-removal load, that is, with removal of material, into the thread turn run-out 11 (FIG. 1), which opens into the peripheral flute.

Through corresponding adjustment of the reverse feed $f_R$ and the reverse rotational speed $r_R$ synchronized therewith, a reverse thread pitch $\alpha_R$ for the thread flanks 19 facing the shavings is obtained in the inner thread 9 in the reverse stroke R. The reverse thread pitch $\alpha_R$ of the thread flanks 19 facing the shavings can be identical to the tapped bore thread pitch $\alpha_G$ or can differ from it, in order to achieve, if need be, a load-optimized inner thread design.

In this way, different flank diameters can be adjusted for different alloys of the workpiece 5, with the respective flank diameters each being adapted specially to the workpiece alloy used. Beyond this, it is also possible to regrind the thread teeth of the thread profile in the course of a reprocessing of the tool bit. In this case, the axial offset by which the tool bit is to be shifted in the axial direction in the flute-forming step at the start of the reverse stroke R would be enlarged in order to achieve a corresponding material engagement in the thread flanks facing the shavings 19.

Described below on the basis of FIGS. 11 to 15, is the structure and the mode of action of a tap drill bit in accordance with another exemplary embodiment. The tap drill bit shown in FIG. 11 fundamentally corresponds to the preceding figures. For this reason, reference is made to the above description. The tap drill bit shown in FIG. 11 has, in addition, a reverse tooth 57, with which, in the reverse stroke R described below on the basis of FIG. 15, material is removed from the flank material allowance $\Delta x$ of the thread flanks facing the shavings 19 in an operationally reliable manner.

Figure 12:
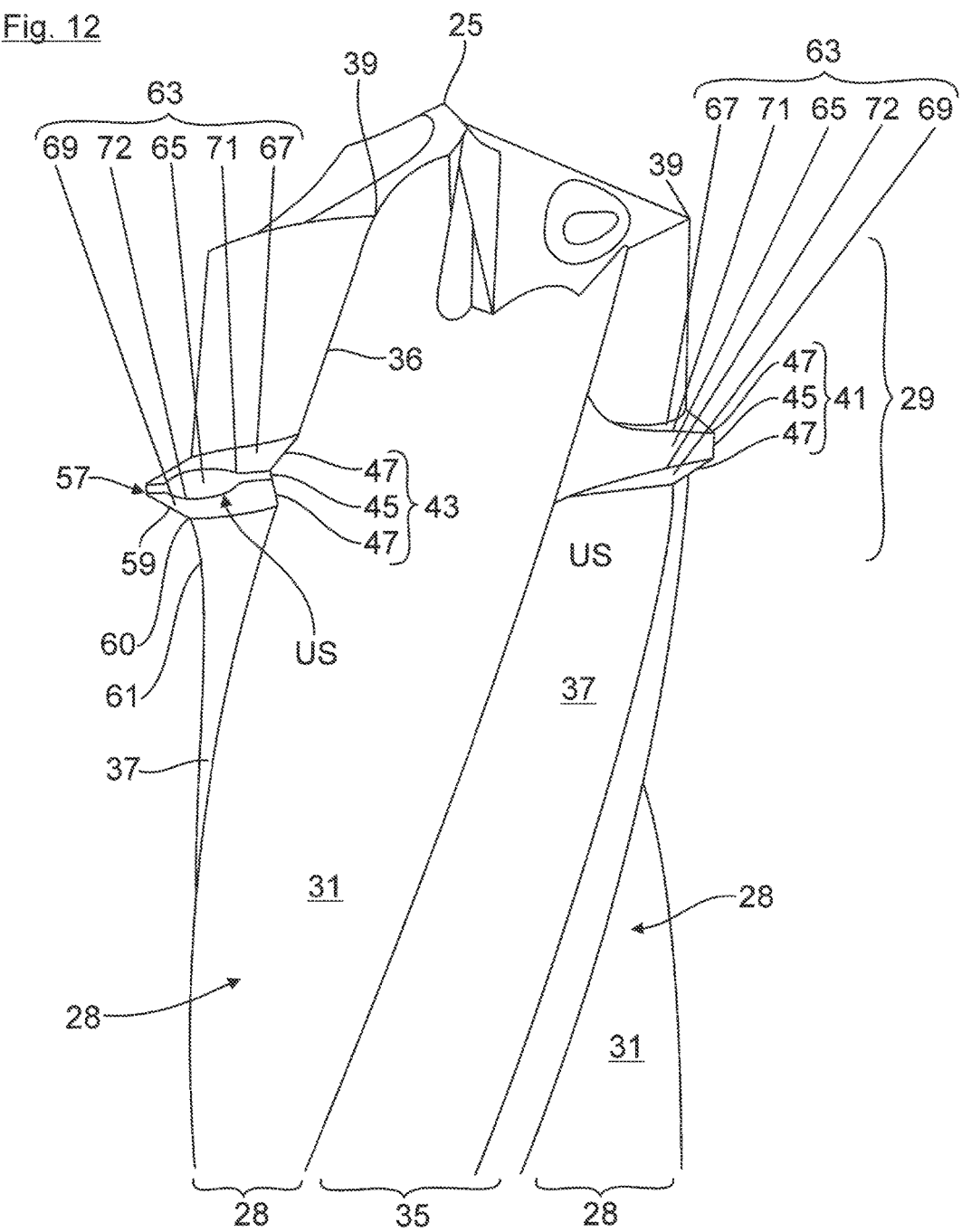
FIG. 12 a different view of a tap drill bit in accordance with another exemplary embodiment.
Figure 13:
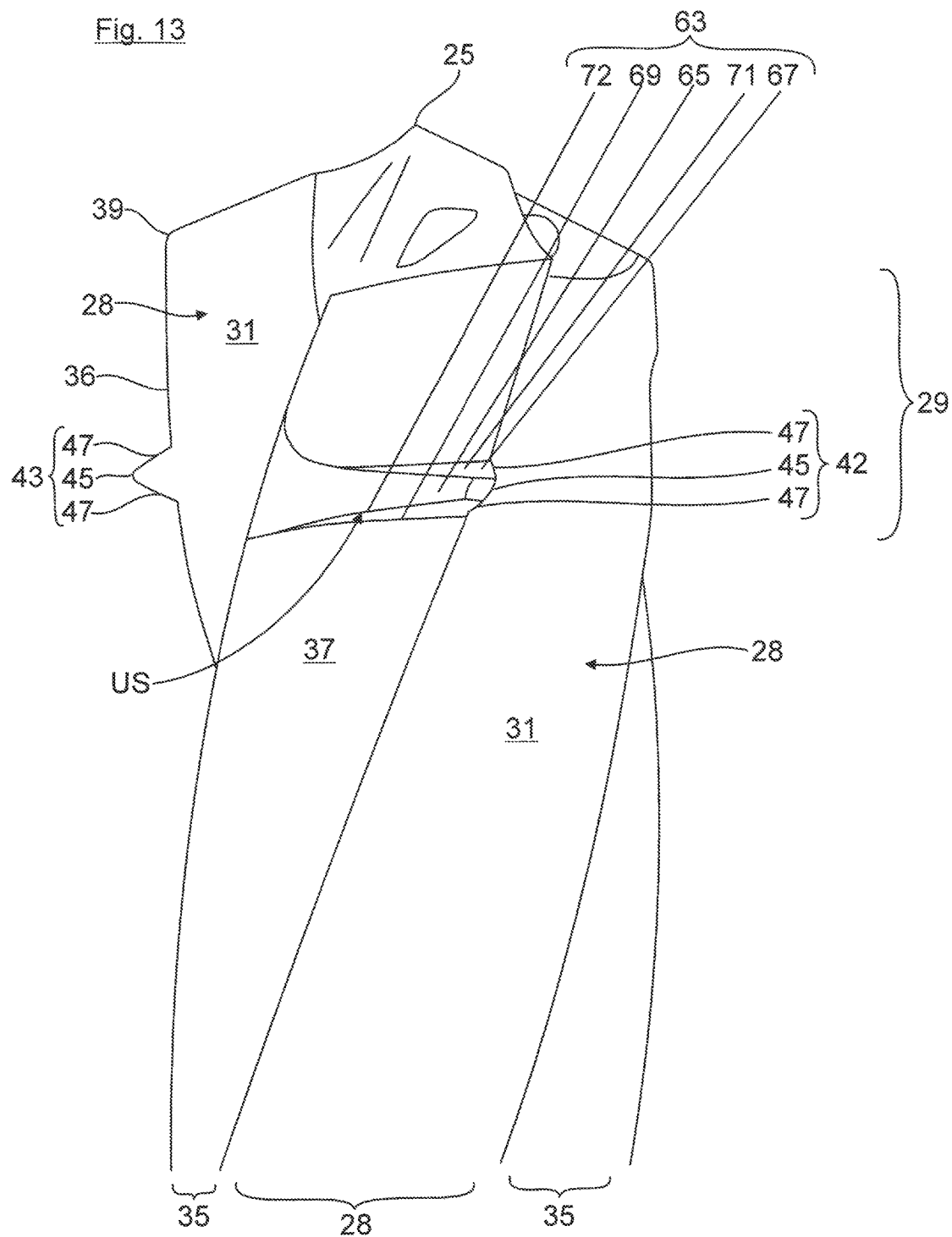
FIG. 13 a different view of a tap drill bit in accordance with another exemplary embodiment.
Figure 14:
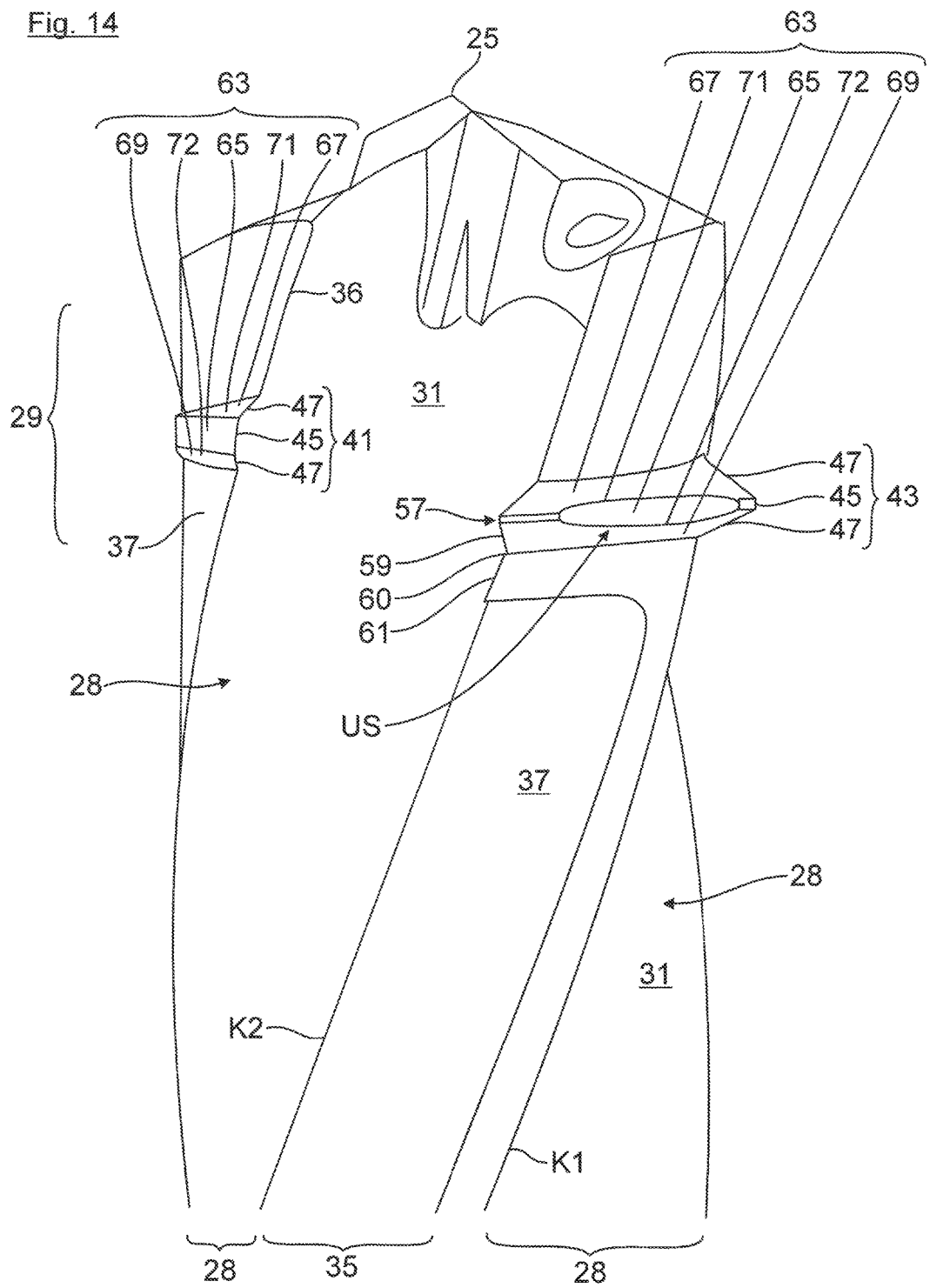
FIG. 14 a different view of a tap drill bit in accordance with another exemplary embodiment.

FIGS. 12 to 14 relate to different side views of the tap drill bit. In FIG. 12, the preliminary cutting tooth 41, the final processing tooth 43, and the reverse tooth 57 are shown. In FIG. 13, the middle tooth 42 and the final processing tooth 43 are shown, while, in FIG. 14, the final processing tooth 43, the reverse tooth 57, and the preliminary cutting tooth 41 are shown.

In FIGS. 12, 14, 15, the reverse tooth 57 is formed with a thread-flank cutting/shaping edge 59. In the reverse stroke R, the tap drill bit is actuated in such a way that its thread-flank cutting/shaping edge 59 removes material of the flank material allowance $\Delta x$ from the thread flanks 19 facing the shavings to produce the final dimension.

Figure 11:
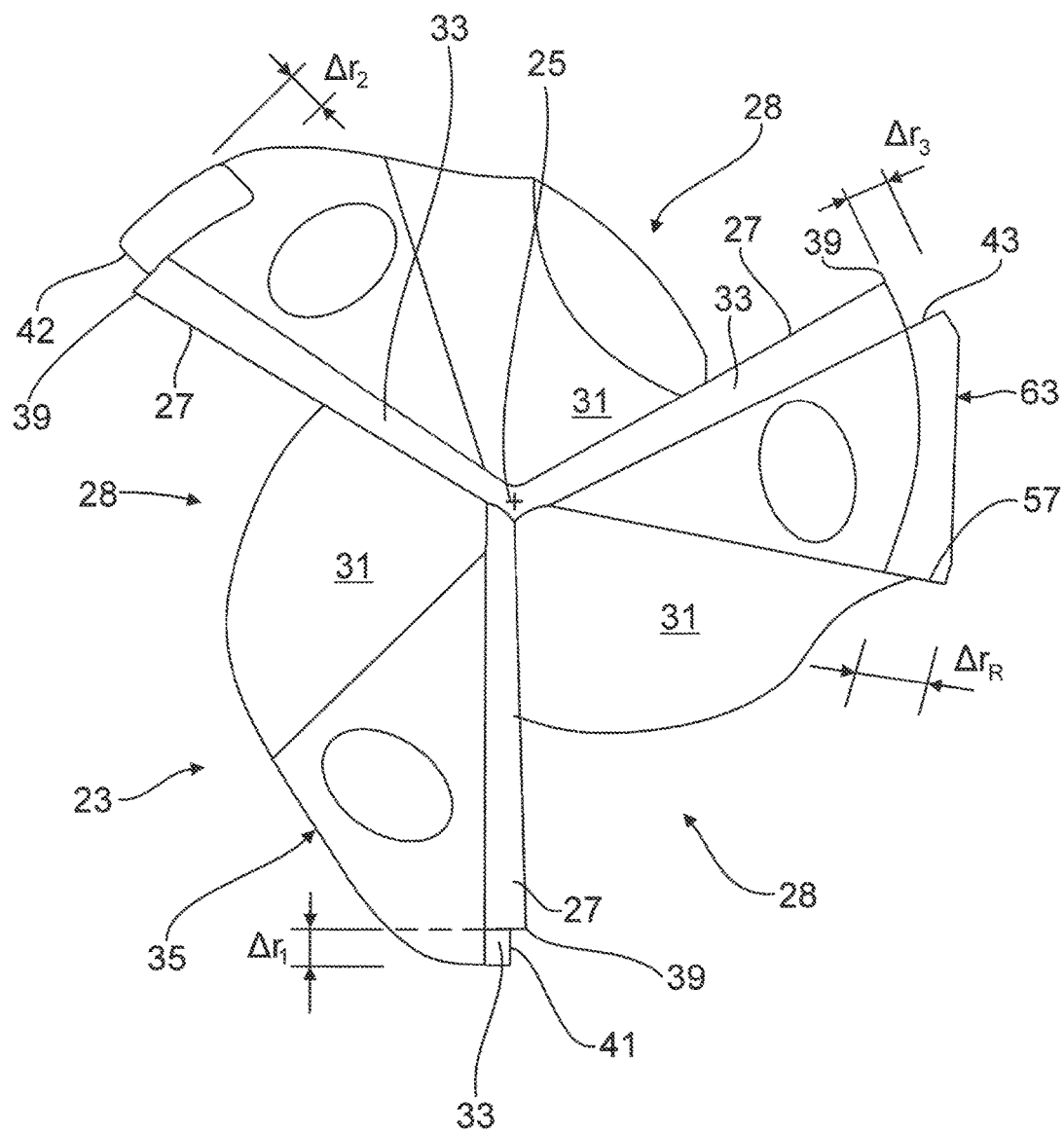
FIG. 11 a view of a tap drill bit in accordance with another exemplary embodiment.

The reverse tooth 57, like the thread profile teeth 41, 42, 43, is also formed on the back surface 37 of the drill bit web. In this case, the reverse tooth 57 protrudes radially outward over the primary cutting corner 39 by a reverse tooth height $\Delta r_R$ (FIG. 11). In FIG. 14 or 15, the thread-flank cutting edge 59 of the reverse tooth 57 transitions at an inner corner 60 of a radially inner cutting edge into a reverse cutting edge 61, which is also active in the reverse stroke R. As a result, in the reverse stroke R, not only does a processing (for example, a processing by removal of shavings) of the thread flanks 19 that face the shavings of the bore-hole inner thread 9 occur, but, at the same time, also a deburring of the thread inner crown 21 of the inner thread 9 occurs, as indicated in FIG. 15. During this deburring, burr formation at the thread inner crown 21, which would otherwise result during the processing of the thread flanks 19 facing the shavings, is prevented.

As further ensues from FIGS. 12 to 15, at the reverse cutting edge 61, the back surface 37 of the drill bit web on the outer peripheral side and the shavings surface 31 of the shavings groove 28 converge. Therefore, the reverse cutting edge 61 and the secondary cutting edge 36 both extend along the longitudinal direction of the drill bit and are formed at longitudinal edges K1, K2 of the drill bit web (FIG. 14) that lie opposite one another in the peripheral direction of the drill bit.

In order to create a stable thread profile 29 at the tap drill bit, a tooth web 63 adjoins each thread profile tooth 41, 42, 43 and the reverse tooth 57 in each case. Said tooth web is formed in each case on the back surface 37 of the drill bit web. As a result, the respective thread profile tooth 41, 42, 43 and the reverse tooth 57 are protected in the tap drilling stroke G and/or in the reverse stroke R against a premature breakage of the tool bit. As ensues from FIG. 14, the thread profile tooth 43 and the reverse tooth 57 are joined to each other via a tooth web 63 that is formed on the back surface 37 of the drill bit web. The tooth web 63 has a radially outer web crown surface 65 as well as a web flank surface 67 that faces the drill bit tip 25 and a web flank surface 69 that faces away from the drill bit tip 25. In order to reduce the tool bit load during the tap drilling stroke G and/or during the reverse stroke R, the above-mentioned web surfaces 65, 67, 69 can be formed at least in part as free surfaces, which are essentially functionless in the tap drilling stroke G and/or in the reverse stroke R.

In accordance with FIGS. 12 to 14, the web crown surface 65 of the tooth web 63 transitions at a first peripheral web edge 71 into the web flank surface 67 that faces the drill bit tip 25. In addition, the web crown surface 65 in a second peripheral web edge 72 transitions into the web flank surface 69 that faces away from the drill bit tip 25. In regard to a reduced tool bit load during the flute-forming stroke N, the tap drill bit has a peripheral flute-cutting edge US (FIGS. 12 to 14) in order to produce the peripheral flute 13 in the flute-forming stroke N. In the illustrated embodiment variant, the peripheral flute-cutting edge US is realized, in particular, by means of the second peripheral web edge 72.

The invention claimed is:

1. A method for producing a tapped bore in a workpiece with a tap drill bit, which, at its drill bit tip, has a primary cutting edge and a thread profile trailing in a tap drilling direction, wherein the method has a tap drilling stroke, in which the tap drill bit is driven into the workpiece with a tap drilling advance in the tap drilling direction and at a tap drilling rotational speed synchronized therewith, and the tool-primary cutting edge produces a core-hole bore, and the thread profile of the tool forms an inner thread at the inner wall of the core-hole bore, and has a reverse stroke, in which the tap drill bit is guided in a reverse direction out from the tapped bore with an oppositely directed reverse feed as well as at a reverse rotational speed synchronized therewith, so that the thread profile of the tool is guided in the thread turn of the inner thread out from the tapped bore, wherein, in the tap drilling stroke, shavings are produced and conveyed in a shavings discharge direction, which is oppositely directed to the tap drilling direction, out of the tapped bore and collide here with thread flanks of the inner thread that face the shavings, wherein, in the tap drilling stroke, the thread flanks of the inner thread that face the shavings are not yet produced with a final dimension, but rather are produced with a flank material allowance and, in fact, produced with formation of a collision contour, with which the shavings to be discharged collide.

2. The method according to claim 1, wherien, in the tap drilling stroke, the inner thread geometry, with the exception of the thread flanks of the inner thread that face the shavings, are produced to the final dimension.

3. The method according to claim 1, wherein, in the reverse stroke, a removal of material occurs, in which the thread profile of the tool bit, guided in the reverse direction out from the tapped bore, removes material from and/or shapes the flank material allowance of the thread flanks that face the shavings to produce the final dimension.

4. The method according to claim 1, wherein, in the tap drilling stroke, the tap drilling advance and the tap drilling rotational speed synchronized therewith result in a tapped bore thread pitch in the thread turn of the inner thread, wherein, in the reverse stroke, the reverse feed and the reverse rotational speed synchronized therewith result in a reverse thread pitch, wherein the reverse feed and/or the reverse rotational speed is or are adjusted in such a way that, in comparison to the tapped bore thread pitch, an identical or a different reverse thread pitch results.

5. The method according to claim 1, wherein, between the tap drilling stroke and the reverse stroke, a flute-forming step is produced, in which the tap drilling stroke is extended in the tap drilling direction by a flute-forming stroke and, in fact, is produced so as to form a peripheral flute without a thread pitch, which adjoins the inner thread, a flute in which the thread profile can rotate without any load, and/or, wherein, by the provision of the peripheral flute, it is possible for the tap drill bit with a cutting edge to produce a peripheral thread countersink in the bore opening of the bore, wherein the peripheral thread countersink is produced during the above flute-forming step.

6. The method according to claim 5, wherein, in the flute-forming step, the tap drill bit is moved beyond the desired thread depth in the tap drilling direction until a desired bore depth is reached, and, in fact, this is conducted with a flute-forming advance and at a flute-forming rotational speed that do not need to be synchronized to each other and/or differ from the tap drilling advance and from the tap drilling rotational speed.

7. The method according to claim 6, wherein, when the desired bore depth is reached, the flute-forming advance is reduced to zero and the flute-forming rotational speed is reduced to zero for preparation of a reversal in the direction of rotation required for the reverse stroke.

8. The method according to claim 5, wherein, in the flute-forming step, the thread profile of the tap drill bit, as viewed in the axial direction, rotates completely in the peripheral flute of the tapped bore.

9. The method according to claim 5, wherein, during the tap drilling stroke, the flute-forming stroke and/or the reverse stroke, the axis of rotation of the tap drill bit and the longitudinal axis of the bore are aligned coaxially with each other.

10. The method according to claim 5, wherein, at the start of the reverse stroke, the tap drill bit is actuated in such a way that the thread profile tooth is driven into the thread turn run-out, which opens into the peripheral flute with shavings removal and/or shaping load, that is, with removal of material and/or with shaping of material.

11. A tap drill bit, comprising:

a clamping shank and a tapped bore bit body adjoined thereon, along the longitudinal axis of which at least one shavings groove extends up to a front-end primary cutting edge at the drill bit tip, at which primary cutting edge a shavings surface, which delimits the shavings groove, and a front-end free surface of the drill bit tip converge, wherein, in the peripheral direction of the tool bit, the shavings groove is delimited by at least one drill bit web, and the shavings surface of the shavings groove transitions, with formation of a secondary cutting edge, into a back surface of the drill bit web on the outer peripheral side, and wherein the secondary cutting edge and the front-end primary cutting edge converge at a radially outer primary cutting corner, wherein, at the back surface of the drill bit web on the outer peripheral side, a thread profile with at least one thread profile tooth is formed, wherein the thread profile tooth has a radially outer profile-base cutting/shaping edge, which protrudes radially outward over the primary cutting corner by a tooth height, wherein the thread profile of the tool has at least one reverse tooth, which has a thread-flank cutting/shaping edge, by which, during the reverse stroke, the flank material allowance of the thread flanks that face the shavings undergoes material removal and/or can be shaped to the final dimension.

12. The tap drill bit according to claim 11, wherein the reverse tooth, which is formed on the back surface of the drill bit web, protrudes radially outward over the primary cutting corner by a reverse tooth height, and/or in that the thread-flank cutting edge of the reverse tooth transitions at a radially inner cutting-edge inner corner into a reverse cutting edge, and in that, in particular, by the reverse cutting edge, in the reverse stroke, the thread inner crown is processed, in particular, deburred.

13. The tap drill bit according to claim 12, wherein, in the tap drilling stroke, the reverse tooth and/or the reverse cutting edge are functionless, and/or in that the thread profile teeth and/or the reverse tooth are each formed as a shaping tooth, with corresponding shaping edges, and/or as a cutting tooth, with corresponding cutting edges that remove shavings, or as a combination thereof.

14. The tap drill bit according to claim 12, wherein the reverse cutting edge extends in longitudinal direction of the drill bit, and/or wherein, at the reverse cutting edge, the back surface of the drill bit web on the outer peripheral side and the shavings surface of the shavings groove converge, and/or wherein the reverse cutting edge and the secondary cutting edge are formed at longitudinal edges of the drill bit web that lie opposite each other in the peripheral direction of the drill bit.

15. The tap drill bit according to claim 12, wherein the reverse tooth and the thread profile tooth are joined to each other via a tooth web, which is formed on the back surface of the drill bit web, and/or wherein, in the peripheral direction of the drill bit, the tooth web has front sides facing away from each other, each of which forms the thread profile tooth and the reverse tooth.

16. The tap drill bit according to claim 15, wherein the tooth web has a radially outer web crown surface as well as a web flank surface that faces the drill bit tip and a web flank surface that faces away from the drill bit tip, and/or wherein, in particular, the web surfaces are formed at least in part as free surfaces, which, in the tap drilling stroke and/or in the reverse stroke, are essentially functionless.

17. The tap drill bit according to claim 16, wherein, at a first peripheral web edge, the web crown surface transitions into the web flank surface that faces the drill bit tip, and/or wherein, at a second peripheral web edge, the web crown surface transitions into the web flank surface that faces away from the drill bit tip, and wherein at least one of the two peripheral web edges is formed as a peripheral flute cutting edge, by which, in the flute-forming stroke, the peripheral flute adjoining the bore hole inner thread is formed.

* * * * *